(12) United States Patent
Shijo et al.

(10) Patent No.: US 8,631,564 B2
(45) Date of Patent: Jan. 21, 2014

(54) SPOOL FOR A COIL WINDING DEVICE AND METHOD OF LOADING COILS

(75) Inventors: Daisuke Shijo, Tokyo (JP); Masaya Motohashi, Tokyo (JP); Hiroyuki Akita, Tokyo (JP); Toshio Arai, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/061,430

(22) PCT Filed: Sep. 2, 2008

(86) PCT No.: PCT/JP2008/065769
§ 371 (c)(1),
(2), (4) Date: Mar. 18, 2011

(87) PCT Pub. No.: WO2010/026623
PCT Pub. Date: Mar. 11, 2010

(65) Prior Publication Data
US 2011/0192019 A1    Aug. 11, 2011

(51) Int. Cl.
*H02K 15/04*    (2006.01)
*H02K 15/06*    (2006.01)

(52) U.S. Cl.
USPC ............................................. 29/732; 29/596

(58) Field of Classification Search
USPC .................................... 29/596, 732; 140/92.1
See application file for complete search history.

(56) References Cited

U.S. PATENT DOCUMENTS 3,415,292 A * 12/1968 Ericson ........................ 140/92.1
3,579,791 A *  5/1971 Arnold ......................... 29/564.1
(Continued)

FOREIGN PATENT DOCUMENTS

CN          1263371        8/2000
JP       53-065901 A       6/1978
(Continued)

OTHER PUBLICATIONS

International Search Report (PCT/ISA/210) issued on Nov. 25, 2008, by Japanese Patent Office as the International Searching Authority for International Application No. PCT/JP2008/065769.

(Continued)

*Primary Examiner* — Livius R Cazan
(74) *Attorney, Agent, or Firm* — Buchanan Ingersoll & Rooney PC

(57) ABSTRACT

To provide a spool for a coil winding device capable of preventing poor insulation caused by a leakage of coil wires without initially inserted coil wires staying at the vicinity of slot openings. A spool for a coil winding device of this invention includes a plurality of coil winding surfaces increased stepwise in diameter from the bottom upward in a state where the spool is disposed on the coil winding device. The spool includes a front spool part and a rear spool part, which are placed at a distance from each other so that each turn of coil has a length corresponding to arbitrary lamination thickness of the stator core. The plurality of coil winding surfaces includes a coil winding surface corresponding to the outermost coil that is formed so that a portion in a radial pattern from the vicinity of a portion corresponding to a central axis of the stator core towards an opening of the slot in which each coil is loaded is extended at least to a position corresponding to a core back where the roots of the teeth outside the slot of the stator core are connected.

10 Claims, 14 Drawing Sheets

(56) References Cited

U.S. PATENT DOCUMENTS

| | | |
|---|---|---|
| 4,434,819 A | 3/1984 | Kubota et al. |
| 4,648,176 A * | 3/1987 | Moser .............................. 29/596 |
| 5,022,139 A | 6/1991 | Jensen |

FOREIGN PATENT DOCUMENTS

| | | |
|---|---|---|
| JP | 57-095161 | 6/1982 |
| JP | 58-41028 | 3/1983 |
| JP | 59-103568 | 7/1984 |
| JP | 62-262636 A | 11/1987 |
| JP | 2003-164122 A | 6/2003 |
| JP | 2005-094825 A | 4/2005 |
| KR | 2004-0000178 | 1/2004 |
| KR | 2006-0006607 | 1/2006 |

OTHER PUBLICATIONS

Notice of Reasons for Rejection issued on Aug. 21, 2012 by the Japanese Patent Office in corresponding Japanese Patent Application No. 2010-527608, and English translation thereof.

Office Action issued by the Korean Patent Office in corresponding Korean Patent Application No. 10-2011-7004244 on Apr. 16, 2012.

Office Action issued on Sep. 28, 2012 by Korean Patent Office in corresponding Korean Patent Application No. 10-2011-7004244, and translation thereof.

Office Action issued on Mar. 6, 2013 by Korean Patent Office in corresponding Korean Patent Application No. 10-2011-7004244, and partial translation thereof.

Office Action issued on Apr. 15, 2013 by the Chinese Patent Office in corresponding Chinese Patent Application No. 200880130962, and partial English translation thereof.

Korean Office Action issued on Jun. 3, 2013 by the Korean Patent Office in corresponding Korean Patent Application No. 10-2011-7004244, and partial English translation thereof.

Chinese Office Action issued on Aug. 19, 2013 by the Chinese Patent Office in corresponding Chinese Patent Application No. 200880130962, and a partial English translation thereof.

* cited by examiner

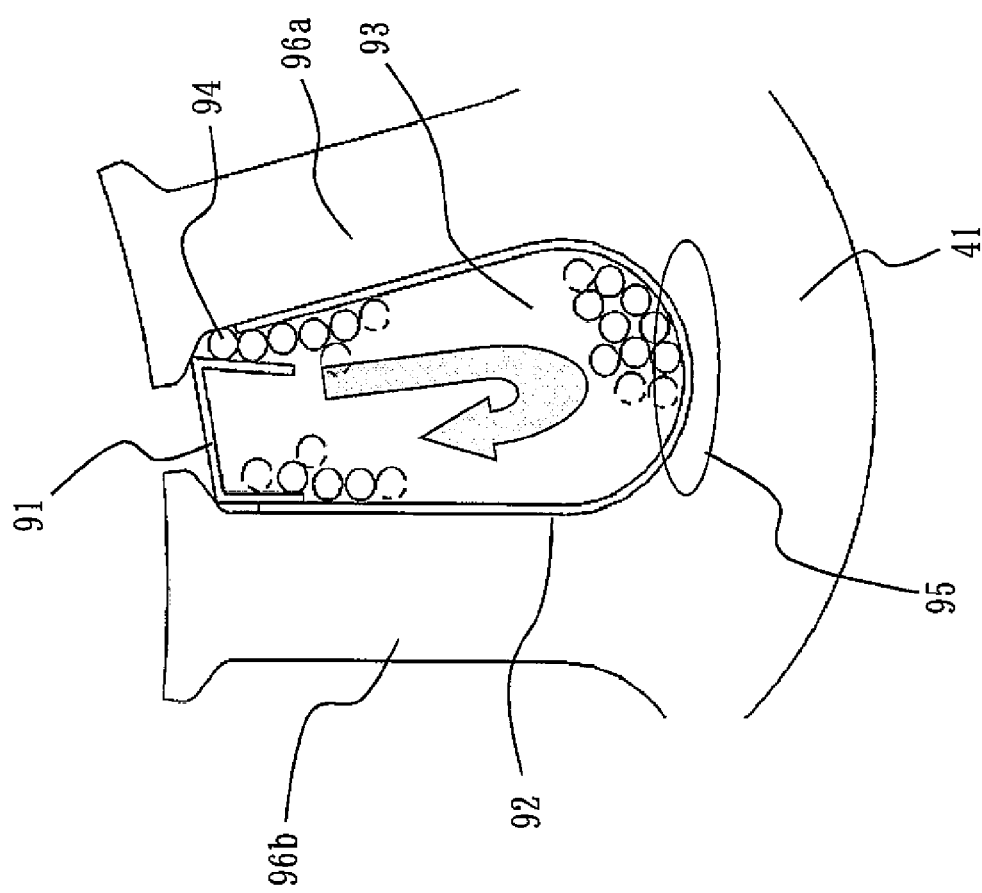

SPOOL FOR A COIL WINDING DEVICE AND METHOD OF LOADING COILS

TECHNICAL FIELD

This invention relates to a spool for a coil winding device for forming coils, and also to a method of loading coils formed by the spool in the stator core of a motor by using a coil insertion device.

BACKGROUND ART

A coil winding device is described in Patent Document 1, for example. The conventional coil winding device is formed to include a coil insertion jig having a plurality of annularly disposed blades; a front spool part arranged to correspond to the coil insertion jig, which is formed to have a plurality of coil winding surfaces that are increased stepwise in diameter from the bottom upwards; a rear spool part facing the front spool part, whish is formed to have a plurality of similar coil winding surfaces to those described above; and a flyer for forming a coil by winding a wire around each of the coil winding surfaces of the pair of spool parts sequentially from the bottom. Then, coils formed on the respective winding surfaces of the pair of spool parts are pushed out into predetermined gaps between the blades of the coil insertion jig.
Patent Document 1: Unexamined Japanese Patent Publication No. SHO 62-262636.

DISCLOSURE OF THE INVENTION

Problems to be Solved by the Invention

The coil winding device disclosed in Patent Document 1, however, poses the following problem. Coil tension at the time of inserting coils increases especially as the space factor of coil to slot is increased. As a result, coils are inserted into the slots of the core in a twisted manner if they are rectangular in shape. This may cause initially inserted wires to stay at the vicinity of slot openings. This may result in a leakage of the initially inserted coil wires from wedges covering the slot openings, thereby causing a direct interference between the coil wires and the core. This may damage wire coatings, thereby causing poor insulation. Hence, there has been a demand for solving the problem.

This invention is directed to solving problems such as that described above. It is an object of the present invention to provide a spool for a coil winding device and a method of loading coils that is capable of preventing poor insulation caused by a leakage of coil wires without initially insulated coil wires staying at the vicinity of the slot openings.

Means to Solve Problems

A spool for a coil winding device according to this invention forms coils to be loaded in slots between the teeth of a stator core of a motor by using a coil insertion device. The spool for a coil winding device may be characterized by including a front spool part and a rear spool part, each of which is formed to have a plurality of coil winding surfaces that is formed to increase in diameter stepwise from the bottom upwards in a state where the spool is set on the coil winding device. The front spool part and the rear spool part may be placed at a distance from each other so that each turn of coil has a length corresponding to arbitrary lamination thickness of the stator core. The plurality of coil winding surfaces of the front spool part may include a coil winding surface corresponding to an outermost coil. The coil winding surface corresponding to the outermost coil may be formed so that a portion in a radial pattern from the vicinity of a portion corresponding to a central axis of the stator core towards an opening of the slot in which each coil is loaded is extended at least to a position corresponding to a core back where the roots of the teeth outside the slot of the stator core are connected.

According to a spool for a coil winding device of this invention, The coil winding surfaces of the front spool part may include a coil winding surface that may be formed so that a portion in a radial pattern from the vicinity of a portion corresponding to a central axis of the stator core towards an opening of the slot in which each coil is loaded is extended at least to a position corresponding to a core back where the roots of the teeth outside the slot of the stator core are connected.

A method of loading coils according to this invention may be characterized by including fitting the coils with a wound shape in the coil insertion device by using the spool for a coil winding device described above, and inserting and loading the coils fitted in the coil insertion device in the slot of the stator core by using the coil insertion device.

Effects of the Invention

A spool for a coil winding device according to this invention may have the following advantageous effect: coils formed by the spool are sequentially arranged from the bottom of each slot when inserted in a stator core, without initially inserted coil wires staying at the vicinity of the slot openings. This may prevent poor insulation caused by a leakage of coil wires from wedges covering the slot openings.

BEST MODE FOR IMPLEMENTING THE INVENTION

Embodiment 1

A first embodiment is described with reference to FIG. 1 to FIG. 10. FIG. 1 shows an external and perspective view of a spool (which is placed upside down when set on a coil winding device). FIG. 2 shows a top view of a coil insertion jig 23 with coils 24 formed by the spool, wherein the coil insertion jig 23 is illustrated with the shape of the outer periphery omitted in part. FIG. 3 shows a front view of the coil insertion jig 23 with the coils 24 formed by the spool. FIG. 4 shows a top view of a coil winding device including a front spool part 1 and a rear spool part 2, as an example. FIG. 5 shows a front view of the coil winding device including the front spool part 1 and the rear spool part 2, as an example. FIG. 6 shows a side view of the coil winding device with the front spool part 1 and the rear spool part 2, as an example. FIG. 7 shows a top view in which the coil insertion jig 23 of FIG. 2 and FIG. 3 is set on a coil insertion device, and a stator core 41 without coils inserted therein yet is set on the tips of blades 21, wherein the coil insertion jig 23 is illustrated with the shape of the outer periphery omitted in part. FIG. 8 shows a front view in which the coil insertion jig 23 of FIG. 2 and FIG. 3 is set on the coil insertion device, and the stator core 41 without coils inserted therein yet is set on the tips of the blades 21. FIG. 9 exclusively shows the stator core 41, a stripper 22, the blades 21, and the coils 24 of FIG. 7. FIG. 10 shows an example of coil shapes obtained by adjusting the length of each turn of coil by varying the distance between the first spool part 1 and the second spool part 2.

FIG. 11 to FIG. 14 show comparative examples. FIG. 11 shows a top view of a comparative example in which coils wound by a spool are set on the coil insertion jig 23, and the stator core 41 is set on a coil insertion device, wherein the coil insertion jig 23 is illustrated with the shape of the outer periphery omitted in part. FIG. 12 shows a front view of an example in which wound coils by the spool are set on the coil insertion jig 23, and the stator core 41 is set on the coil insertion device. FIG. 13 shows a top view of an example illustrating a location relationship among the stator core 41, the coils, and the blades 21 of FIG. 11 and FIG. 12. FIG. 14 shows an enlarged view of a portion A in FIG. 13 illustrating a behavior of coils wound by the spool when the coils are inserted into a slot 93 of the stator core 41.

First, a conventional coil winding device is outlined as a comparative example. A coil winding device described here produces so-called concentric coils, which are formed by winding a plurality of coils of different sizes concentrically so that the centers of the plurality of coils meet. Concentric coils may be used in a motor such as a single-phase induction motor. The single-phase induction motor includes a main winding and an auxiliary winding arranged with a phase shift angle of 90 degrees of an electric angle from the main winding. It is assumed here that the auxiliary winding has been inserted in slots before the main winding is inserted. It is also assumed in the following description that the auxiliary winding, which is not shown in the figures, has been previously inserted in a position where the phase shift angle is 90 degrees of an electric angle from the main winding. In the following explanation, a description will be given of an example of a 2-pole single-phase induction motor. Therefore, the auxiliary winding not shown is assumed to have been previously inserted at the position where the phase shift angle is 90 degrees of a machine angle from the main winding.

In a coil winding process of the coil winding device, a coil is formed by a flyer gyrating around the periphery of a pair of spool parts (a front spool part and a rear spool part) including coil winding surfaces of the same number disposed at a distance from each other. The coil thus formed is then wound and dropped into a predetermined gap between the blades of a coil insertion jig.

Then, blades with coils mounted thereon together with the coil insertion jig are moved on a turntable over to the coil insertion device facing the coil winding device. FIG. 13 shows a top view of the coil insertion device illustrating the coils loaded in gaps between the blades and the core before the coils are inserted therein. The coils are to be loaded on top end portions of the blades in a coil inserting process. As shown in FIG. 13, the coils are arranged in a radial pattern from the vicinity of the central axis in a direction towards gaps between predetermined blades, that is a direction towards the slots in which the coils are inserted, at a portion of the front spool part, that is a portion at the vicinity of the central axis of the core where coils are pushed up towards the core by the stripper. The coils have bent sections at positions corresponding to the vicinities of the slots. The coils are wound around the front spool part which is formed to have coil winding surfaces with a width equal to a distance between adjacent bent sections and then further around the rear spool part, which is spaced apart from the front spool part and formed to have coil winding surfaces with a width equal to that of the front spool part. This makes the coils, which is formed by using a spool of the comparative example, approximately in the shape of rectangle.

Coils 71a, 71b, 71c, 71d, and 71e to be inserted in the stator core 41 (the coils of the main winding with the coil 71a as an outermost coil and the coil 71e as an innermost coil) are transformed (see FIG. 13) to reduce the portion in the radial pattern when pushed up towards the stator core 41 by the stripper 22 shown in FIG. 12.

For example, the outermost coil 71a is transformed continuously into an outermost coil 81a indicated by a two-dot chain line as a result of transformation in the coil inserting process, as shown in FIG. 13. Consequently, the portion in the radial pattern of the coil 71a is reduced up to where the bent section transforming from the portion in a radial pattern in a longitudinal direction of the coil 71a meets the tip of the coil insertion jig 23 (FIG. 3) and the stator core 41 at an earlier stage of the coil inserting process.

Under this condition, on the bottom end surface of the stator core 41, at a portion shown in FIG. 14, for example, the bent section of the coil meets a tooth 96 inside the loop of the coil 71a, and the tension of the coil 71a presses the coil 71a against the tooth 96 via an inner slot insulating paper 92. The coil tension is greater on an outer coil and the greatest on the outermost coil.

This behavior makes initially inserted coil wires carrying higher tension stay unevenly at the side of a slot opening 93a of the stator core 41 and also at the inner side of the loop of the coil 71a in the slot 93 as shown in FIG. 14. Therefore, a plurality of coil wires wound by the same spool is disposed in the slot 93 in an order following an arrow in the slot 93 of FIG. 14.

The arrangement of the respective coil wires in the slot 93 is almost determined in an earlier stage of the coil inserting process when the stripper 22 moves to the stator core 41, and more specifically at the time when all the plurality of coil wires wound around the same coil winding surface start moving into the slot 93 on the bottom end surface of the stator core 41. This coil wire arrangement rarely changes with restrictions about other coil wires and geometric restrictions about the inner wall of the slot 93, even at the time when the stripper 22 has run through the stator core 41 at a completion of the coil inserting process.

The coil insertion behavior described above fails to allow a wedge 91 for the slot opening 93a of the slot 93 to be inserted, after coils are inserted, between the stator core 41 and initially inserted coil wires with high coil tension on the route of inserting the wedge 91 especially when the space factor of the coil 71a to the slot 93 is improved. This may cause a phenomenon (called coil wire leakage), in which the coil wires 94 leak from inside the U-shaped wedge 91 like the one leaking from the wedge shown in FIG. 14. Then, the coil wires 94 leaking from the wedge may directly interfere with the stator core 41. This may damage wire coatings, thereby resulting in poor insulation. Therefore, there has been a demand for solving the problem.

The wedge is an insulating material that covers a slot opening in order to keep wound coils within the slot. Wedges are usually annularly disposed on the coil insertion jig at positions corresponding to those of the slots of the stator core. When coils are inserted into the slots, the wedges are pushed by wedge pushers provided at positions corresponding to those of the wedges for pushing the wedges. This allows the wedges to be inserted at the vicinity of slot openings at the same time or after the coils are inserted.

A spool for a coil winding device may be formed to include the front spool part 1 and the rear spool part 2. The spool for a coil winding device of this embodiment is characterized by the shapes of the first spool 1 and the rear spool part 2.

FIG. 1 illustrates the shapes of the front spool part 1 and the rear spool part 2. Specifically, the front spool part 1 may include step-like coil winding surfaces 5a, 5b, 5c, 5d and 5e formed to increase in diameter stepwise from the bottom (FIG. 1 shows the front spool part 1 arranged upside down when set on a coil winding device), escape grooves 3 for the tip of a coil insertion jig 23 (see FIG. 3) to which the blades 21 (see FIG. 2 and FIG. 3) of the coil insertion jig are to be inserted, and a coil pusher slide groove 4 through which the coil pusher 32 (see FIG. 4 to FIG. 6) is to slide.

The front spool part 1 is characterized in that a portion in a radial pattern extending from a portion corresponding to the central axis of the stator core 41 towards the gaps between the predetermined blades 21 is longer than those of conventional spools, extending up to or beyond a position corresponding to the core back 95 (see FIG. 14) where the roots of teeth forming the slot 93 of the stator core 41 are connected. In other words, the portion in a radial pattern extends in the direction towards the opening of the slot 93 to which at least an outermost coil 24a among coils 24a, 24b, 24c, 24d, and 24e is inserted (see the innermost coil 24a and the outermost coil 24e in FIG. 2). The configuration of the front spool part will be elaborated later in the description of this embodiment. The coils 24a, 24b, 24c, 24d, and 24e are also called simply as coils 24.

The rear spool part 2 is formed to include step-like coil winding surfaces 6a, 6b, 6c, 6d and 6e that are formed to increase in diameter stepwise from the bottom (FIG. 1 shows the rear spool part 2 arranged upside down when set on a coil winding device).

The shape of each coil winding surface of the rear spool part 2 is adjusted so that the length of each turn of the coil, which is obtained by winding the coil around the pair of spool parts spaced apart from each other according to arbitrary lamination thickness of the stator core 41, of each coil winding surface is optimal to the length of the coil end when the stator core 41 is inserted.

The coil ends are portions of coils inserted in the slots protruding outside from the axial ends of the core.

First, the front spool part 1 and the rear spool part 2 are set to the spool bracket 31 at a distance from each other in the coil winding device so that the length of each turn of the coil corresponds to the lamination thickness of the stator core 41 as shown in FIG. 4 to FIG. 6.

At a lower portion thereof, the coil insertion jig 23, illustrated in FIG. 3 in detail, is disposed as a jig for receiving wound coils.

The coil insertion jig 23 shown in FIG. 3 is formed to include the stripper 22 that is vertically slidable for pushing coils upwards, the blades 21 that move together with the stripper 22 for catching coils, and wedge guides 25 of the same number as that of the blades 21. Specifically, the blades 21 are annularly disposed on the periphery of the stripper 22 with predetermined gaps in between. The wedge guides 25 are insertion guides for the wedges 91 for the slot openings 93a to prevent coils from falling out after the coils have been loaded in the stator core 41. The wedge guides 25 are fixed to the coil winding device at positions whose phase is the same as that of the blades 21.

The spool is formed to include the front spool part 1 with coil winding surfaces 5a, 5b, 5c, 5d and 5e and the rear spool part 2 with coil winding surfaces 6a, 6b, 6c, 6d and 6e. The distance between the front spool part 1 and the rear spool part 2 may be adjusted to change the length of each turn of the coil so as to correspond to arbitrary lamination thickness of the stator core 41, as shown in FIG. 10.

FIG. 10 shows solid lines indicating the rear spool part 2 and the coils 24a, 24b, 24c, 24d and 24e in the case of a reduced lamination thickness of the stator core 41. FIG. 10 also shows two-dot chain lines indicating the rear spool part 2 and the coils 24a, 24b, 24c, 24d and 24e in the case of an increased lamination thickness of the stator core 41.

The front spool part 1 is formed to include the escape grooves 3 for the tip of the cylindrical coil insertion jig (see FIG. 1 and FIG. 10) to avoid interference among the blades 21, the wedge guides 25 and the tip of the coil insertion jig 23 of FIG. 3 when the spool is descended in the coil winding process, which will be discussed later.

The coil winding surfaces 5a, 5b, 5c, 5d and 5e of the front spool part 1 are formed as follows: as shown in FIG. 9, the portion in a radial pattern from a portion corresponding to the central axis of the escape grooves 3 for the tip of the coil insertion jig, that is, the central axis of the stator core 41 to which coils are to be inserted, towards predetermined gaps between the blades 21, that is, in the direction towards the slot 93 to which each coil is to be inserted, is extended longer than the case of conventional spools, extending up to or beyond a position corresponding to the core back 95 where the roots of the teeth forming the slots 93 of the stator core 41 are connected.

The front spool part 1 is also formed to include the coil pusher slide groove 4 (see FIG. 1 and FIG. 10) that allows the coil pusher 32 for winding and dropping coils and loading wound coils in the gaps between the blades 21, which will be described later in detail, to slide.

The shape of each coil winding surface of the rear spool part 2 is adjusted so that the length of each turn of the coil on each coil winding surface obtained by winding the coil around the pair of spool parts (the front spool part 1 and the rear spool part 2) spaced apart from each other according to arbitrary lamination thickness of the stator core 41 is optimal to the length of the coil end when the stator core 41 is inserted.

At the start of coil winding, the pair of spool parts (the front spool part 1 and the rear spool part 2) are set at the position where the blades 21 are inserted only at tip portions from the bottom end of the front spool part 1 into the escape grooves 3 at the tip of the coil insertion jig formed on the front spool part 1 as shown in FIG. 4 to FIG. 6.

Subsequently, a flyer 33 gyrates around the pair of spool parts (the front spool part 1 and the rear spool part 2) for reeling out wires by gyration. Then, the flyer 33 winds wires around the lowest coil winding surface 5e of the front spool part 1 and the lowest coil winding surface 6e of the rear spool part 2 to form the innermost coil 24e shown in FIG. 2. The coil 24e thus formed is then wound and dropped in a predetermined gap between the blades 21 by gravity or by being pushed by subsequent newly produced coils 24e at the same coil winding surfaces 5e and 6e.

Once the winding operation is completed with the lowest coil winding surface (the coil winding surface 5e of the front spool part 1 and the coil winding surface 6e of the rear spool part 2), a spool bracket 31 is descended by one step of the coil winding surfaces by a drive mechanism not shown in the figure to lower the pair of spool parts. The winding operation is then continuously performed with the next coil winding surfaces, that is, the coil winding surface 5d of the front winding spool part 1 and the coil winding surface 6d of the rear winding spool 2.

Finally, when the winding operation is completed with the top coil winding surfaces, that is, the coil winding surface 5a of the first winding spool part 1 and the coil winding surface 6a of the rear winging spool part 2, then the pair of spool parts are returned to the original position. Then, the coil pusher 32 is descended not by the spool bracket 31 but by the drive mechanism not shown in the figures. This allows coils having failed to drop from the spool to drop into the gaps between the blades 21.

When the coil winding operation is completed, then coils loaded in the gaps between the blades 21 are moved on a turntable not shown in the figures together with the coil insertion jig 23 equipped with the stripper 22 and the blades 21 to the coil insertion device facing the coil winding device.

In the coil inserting process, the stator core 41 is fitted to the blades 21 at the top end portion, and subsequently fixed on a device mount by a core clamp 42 as shown in FIG. 7 and FIG. 8.

Specifically, a location relationship between the coils 24a, 24b, 24c, 24d and 24e and the stator core 41 of this case is shown in FIG. 9. The shapes of the coils are thus based on those of the front spool part 1 and the rear spool part 2.

The coils 24a, 24b, 24c, 24d and 24e to be inserted in the stator core 41 are transformed to reduce the portion in the radial pattern a little when pushed up towards the stator core 41 by the stripper 22 shown in FIG. 3.

For example, the outermost coil 24a is transformed continuously into an outermost coil 51a indicated by a two-dot chain line, which has been transformed in the coil inserting process as shown in FIG. 9. The amount of transformation of the outermost coil 51a made in the coil inserting process is smaller at the vicinity of the core back 95 where the roots of the teeth are connected than an outermost coil 81a indicated by a two-dot chain line of the comparative example of FIG. 13, which has been transformed in the coil inserting process. The portion in the radial pattern is reduced in shape from the vicinity of the outer periphery of the stator core 41 and outside.

This may prevent therefore the following phenomenon observed in the comparative example as shown in FIG. 13: the outermost coil 71a continuously transforms into the outermost coil 81a indicated by the two-dot chain line as a result of transformation in the coil inserting process, and at an earlier stage of the coil inserting process, the portion in the radial pattern of the coil 71a is reduced in shape up to where the bent section transforming from the radial pattern in a longitudinal direction meets the tip of the coil insertion jig 23 and the stator core 41.

Therefore, when the coils 24a, 24b, 24c, 24d and 24e of this embodiment are pushed up towards the stator core 41 by the strippers 22 shown in FIG. 3, the bent sections of the coils hardly touch the teeth 96 inside the loop of the coil 24a at the bottom surface of the stator core 41. Therefore, the tension of the coil 24a causing the coil 24a to be pressed against the teeth 96 via the inner slot insulating paper 92 is lower than that of the comparative example.

When the stator core 41 is fixed, the stripper 22 and the accompanying blades 21 are then ascended through the stator core 41. This allows the coils to be finally inserted in the slots 93 of the stator core 41.

Then, the wedges 91 are subsequently inserted in the slots with a push by the wedge pushers not shown in the figures and with a guide of the wedge guide 25. The strippers 22 and the blades 21 are thereafter returned to the original positions, which terminates the whole course of the coil inserting process.

Referring further to FIG. 9, the slots 93 inside the loop of the innermost coil 24e are blank without coils inserted therein. It is assumed in this embodiment that auxiliary coils not shown in the figures have been previously fitted in the stator core 41. The auxiliary coils are the coil 24 arranged and inserted with a 90 degree rotation with respect to the central axis of the stator core 41.

As another example, the two kinds of coils, the auxiliary coils and the coils 24, may be loaded in the predetermined same slot, with the number of turns of coils to be determined by the space factor in each slot according to the relation between the auxiliary coils and the coils 24.

It is also possible to modify the spool of this embodiment including five coil winding surfaces by adding another coil winding surface so as to load wound coils also in the blank slots inside the loop of the innermost coil 24e.

It is still also possible to use an alternative spool based on this embodiment that is formed to include one or more coil winding surfaces for forming coils to be loaded in slots spaced apart by a predetermined number of slots. A plurality of coils formed by winding wires around the alternative spool may be placed around the central axis of the core at a predetermined angle, and then fitted to the stator core 41.

The coil shape formed by winding coils around the spool of this embodiment allows coils to be inserted and loaded in the slots 93 of the stator core 41 sequentially from the bottom of the slots 93, according to the principle described above. Therefore, initially inserted coils never stay at the vicinity of the openings of the slots 93. Hence, there is an advantageous effect of solving the problem of poor insulation caused by the leakage of coil wires.

It is most desirable to form the spool so that all the coils are shaped as described in this embodiment. However, a certain advantageous effect may be expected if the spool is formed so that at least the outermost coil susceptible to the problem is shaped as described in this embodiment.

It should be noted that the front spool part and the rear spool part illustrated as single individuals in the figures should not necessarily be so. The front spool part and the rear spool part of single individuals may alternatively be configured to include two or more divided pieces each, as long as coils can be shaped as described above.

BRIEF DESCRIPTION OF THE DRAWINGS

FIG. 3 is set on a coil insertion device, and a stator core 41 without coils inserted therein yet is set on the tips of blades 21, according to the first embodiment.

FIG. 3 is set on the coil insertion device, and the stator core 41 without coils inserted therein yet is set on the tips of the blades 21, according to the first embodiment.

FIG. 14 shows an enlarged view of a portion A of FIG. 13 of a comparative example illustrating a behavior of coils wound by the spool, when inserted into a slot 93 of the stator core 41.

Figure 1:
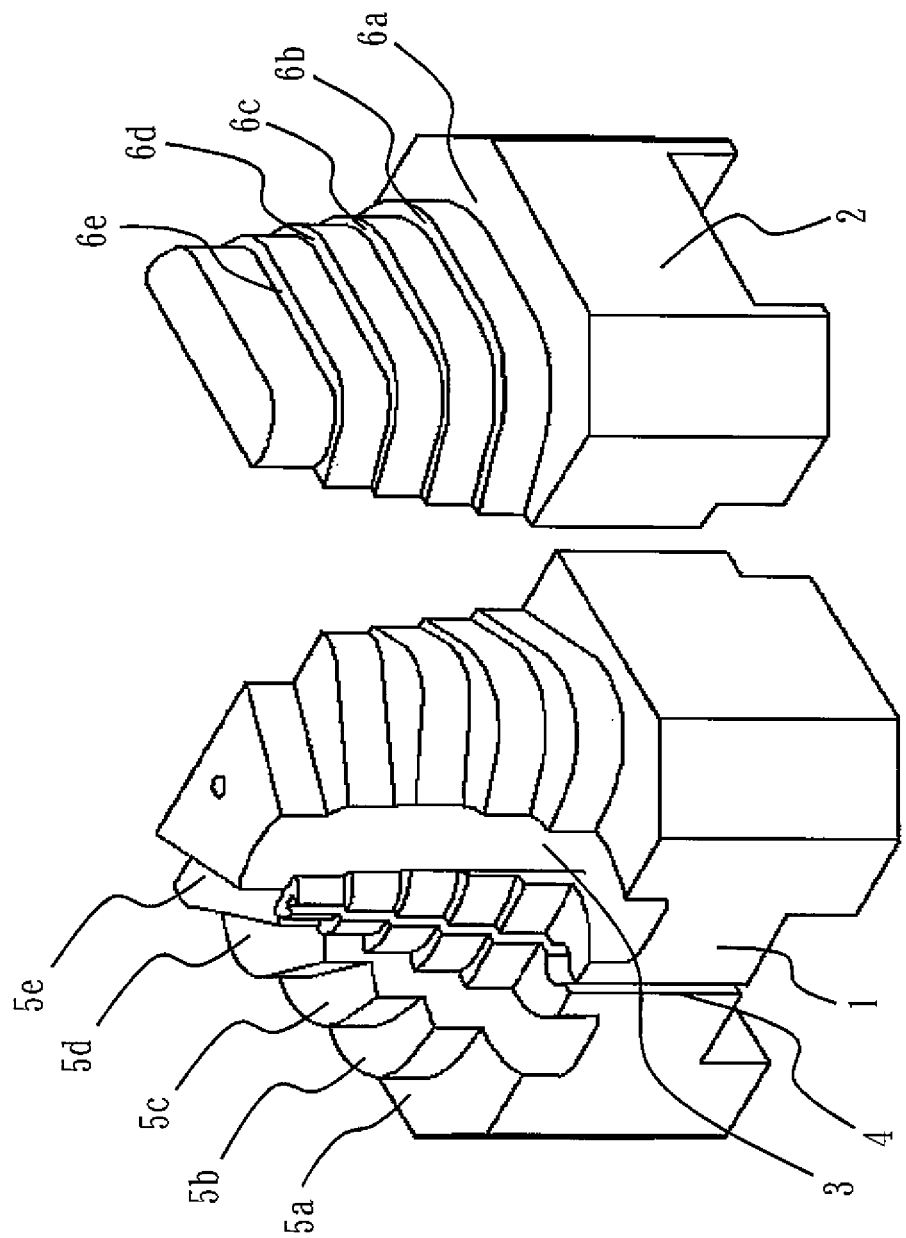
FIG. 1 shows an external and perspective view of a spool (which is placed upside down when mounted on a coil winding device), according to a first embodiment.
Figure 2:
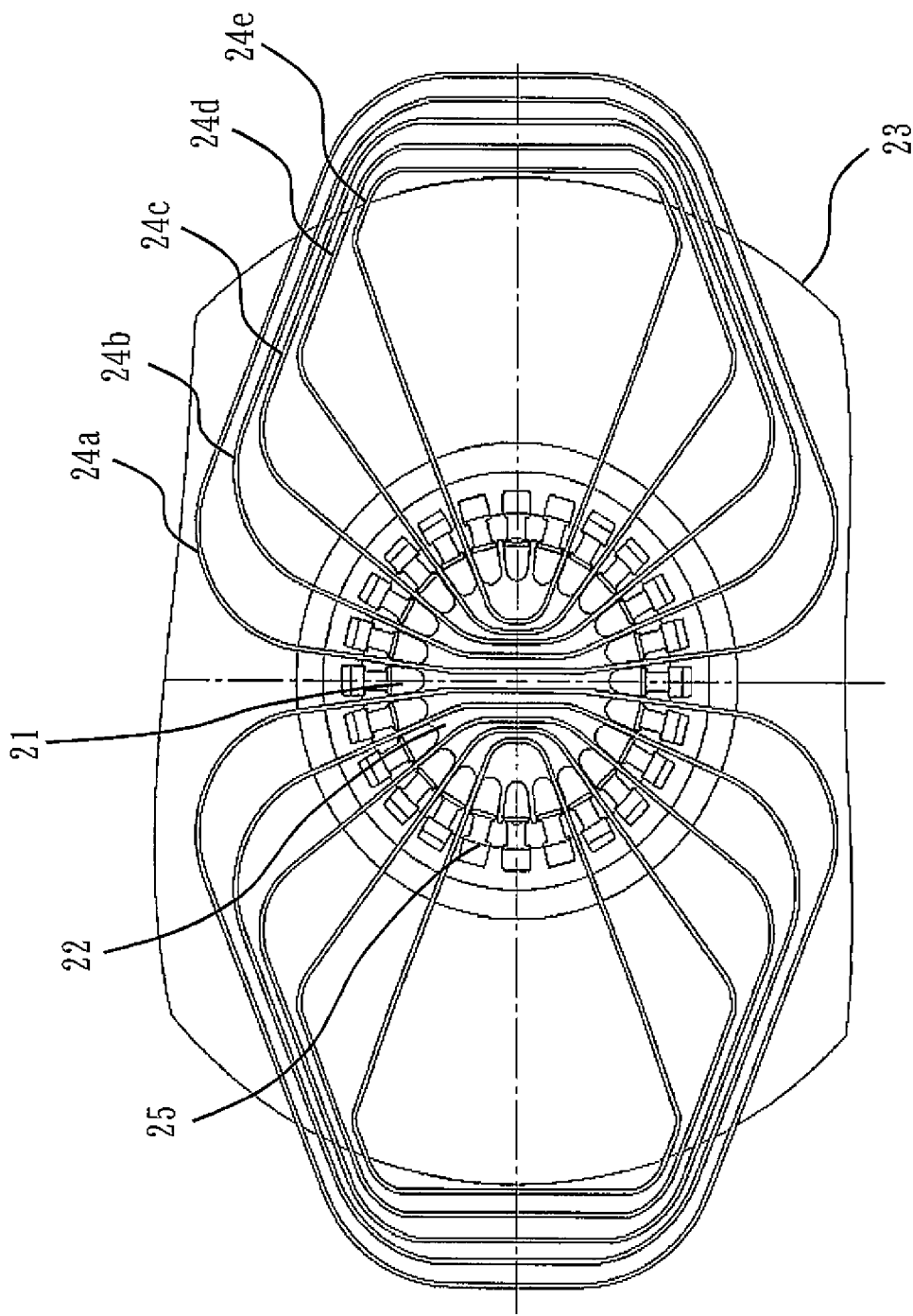
FIG. 2 shows a top view of a coil insertion jig 23 with coils 24 formed by the spool, according to the first embodiment.
Figure 3:
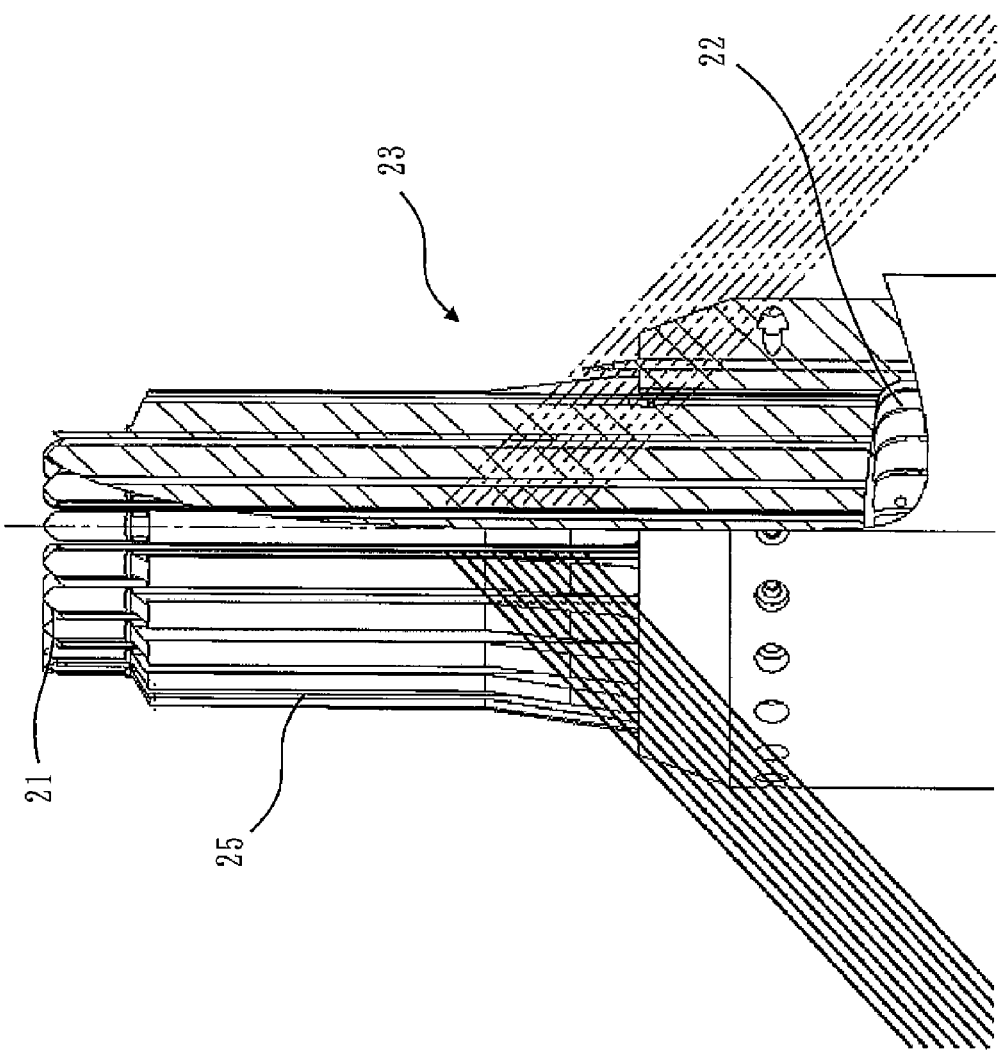
FIG. 3 shows a front view of the coil insertion jig 23 with the coils 24 formed by the spool, according to the first embodiment.
Figure 4:
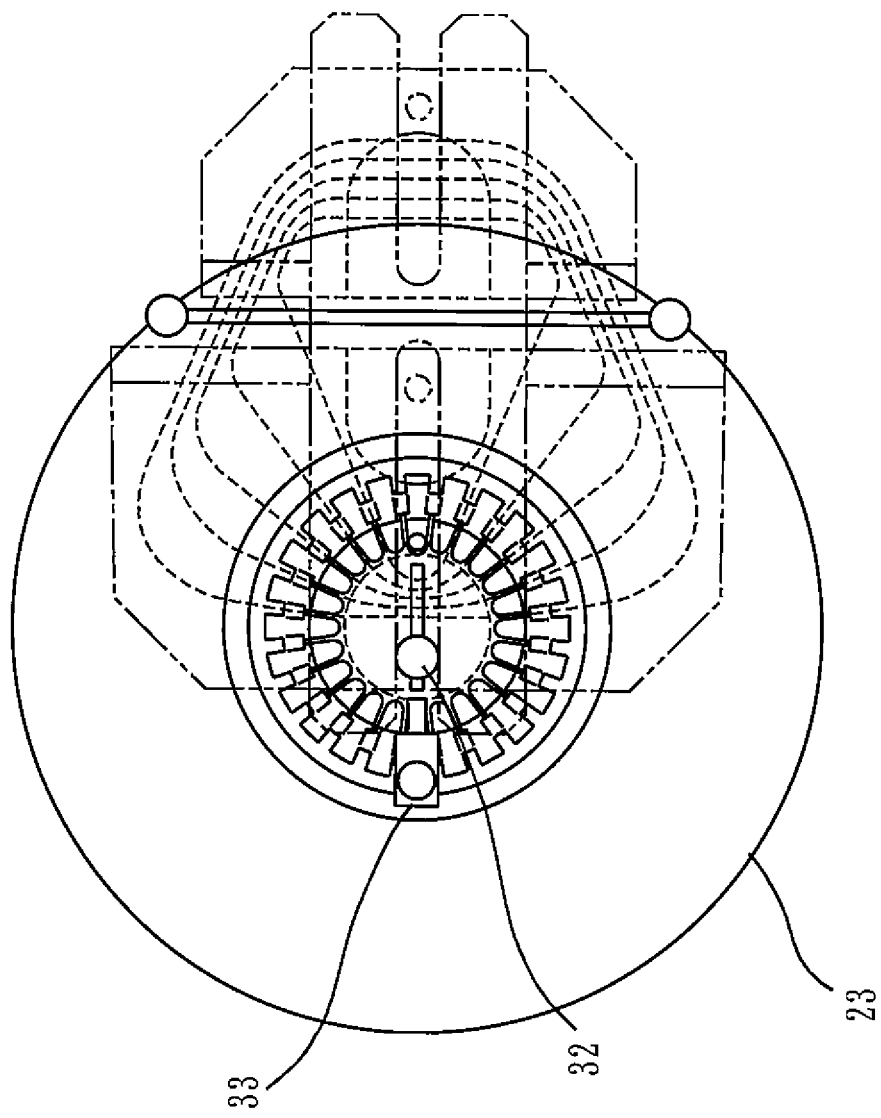
FIG. 4 shows a top view of a coil winding device having the front spool part 1 and a rear spool part 2, as an example, according to the first embodiment.
Figure 5:
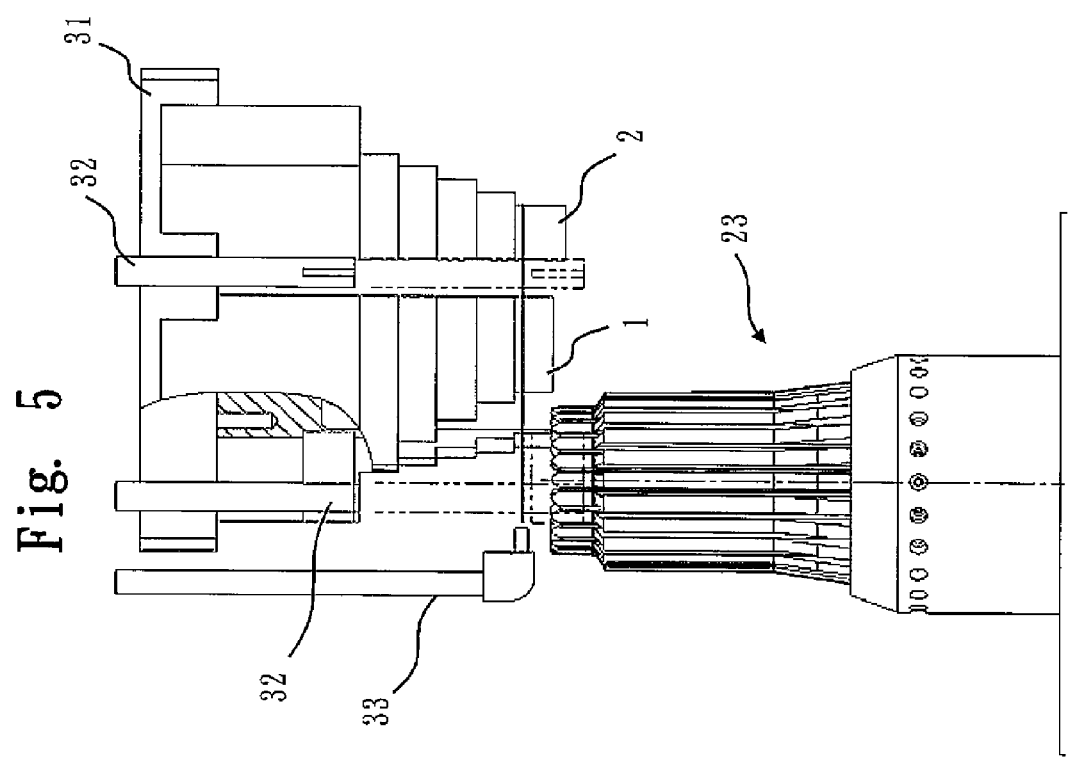
FIG. 5 shows a front view of the coil winding device having the front spool part 1 and the rear spool part 2, as an example, according to the first embodiment.
Figure 6:
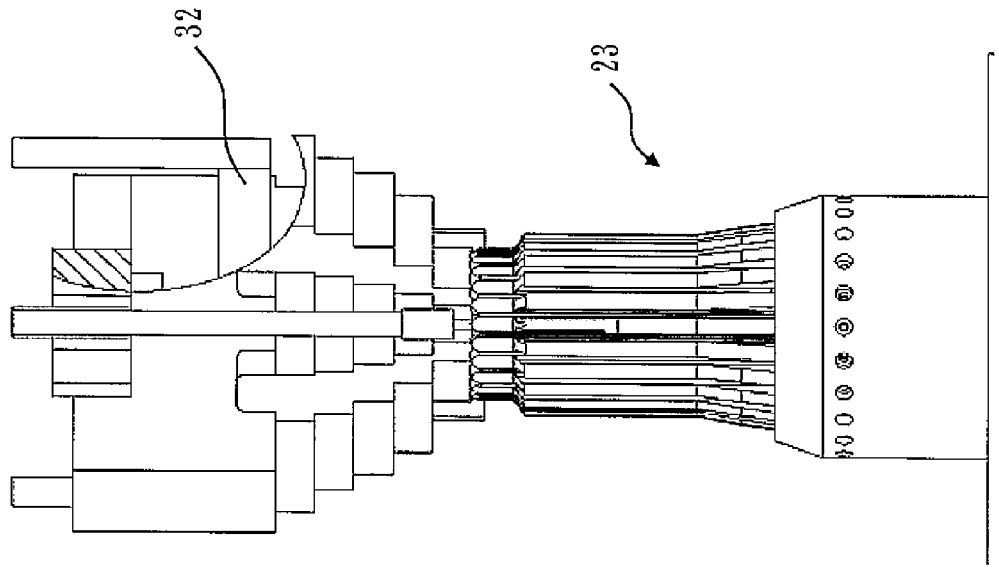
FIG. 6 shows a side view of the coil winding device having the front spool part 1 and the rear spool part 2, as an example, according to the first embodiment.
Figure 7:
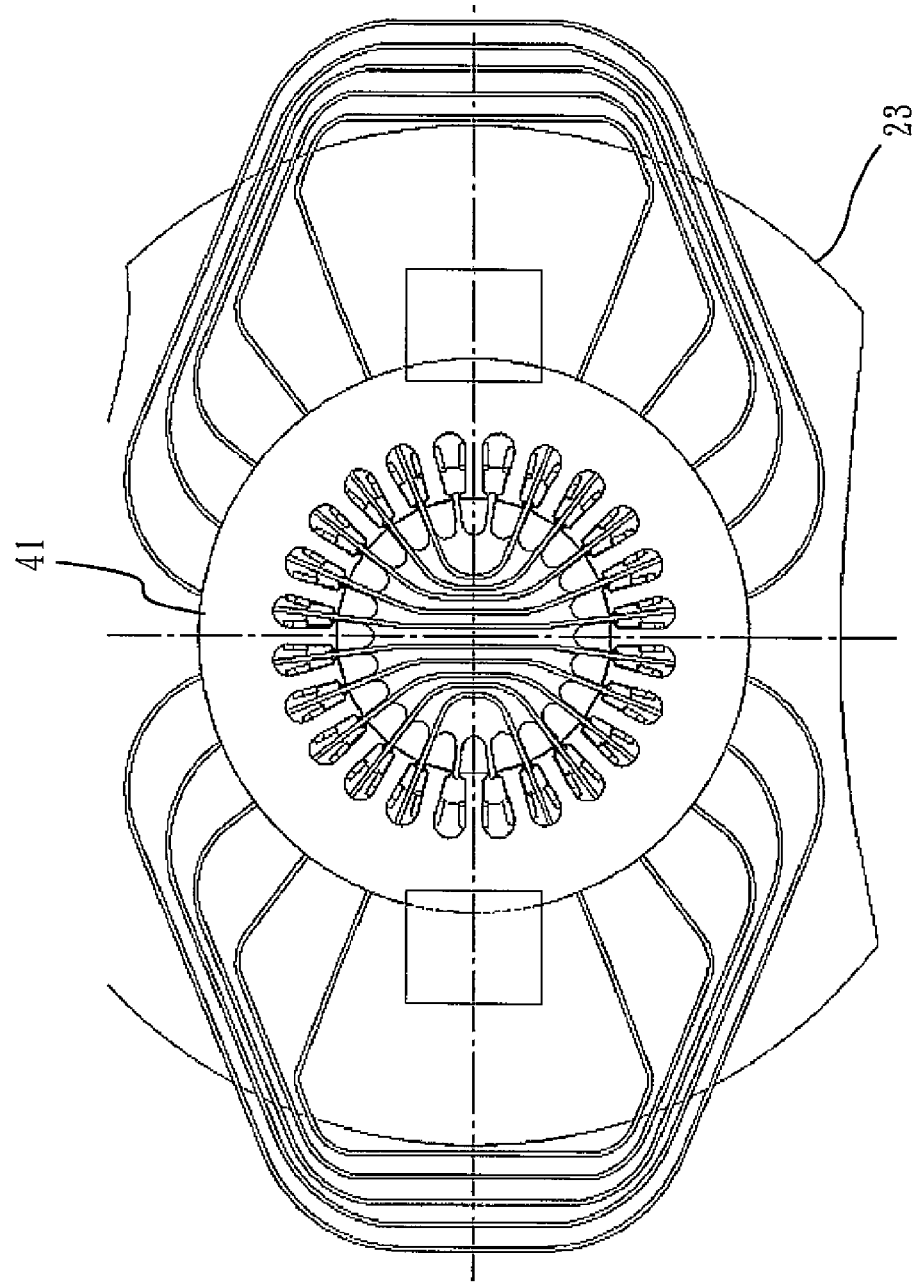
FIG. 7 shows a top view in which the coil insertion jig 23 of FIG. 2
Figure 8:
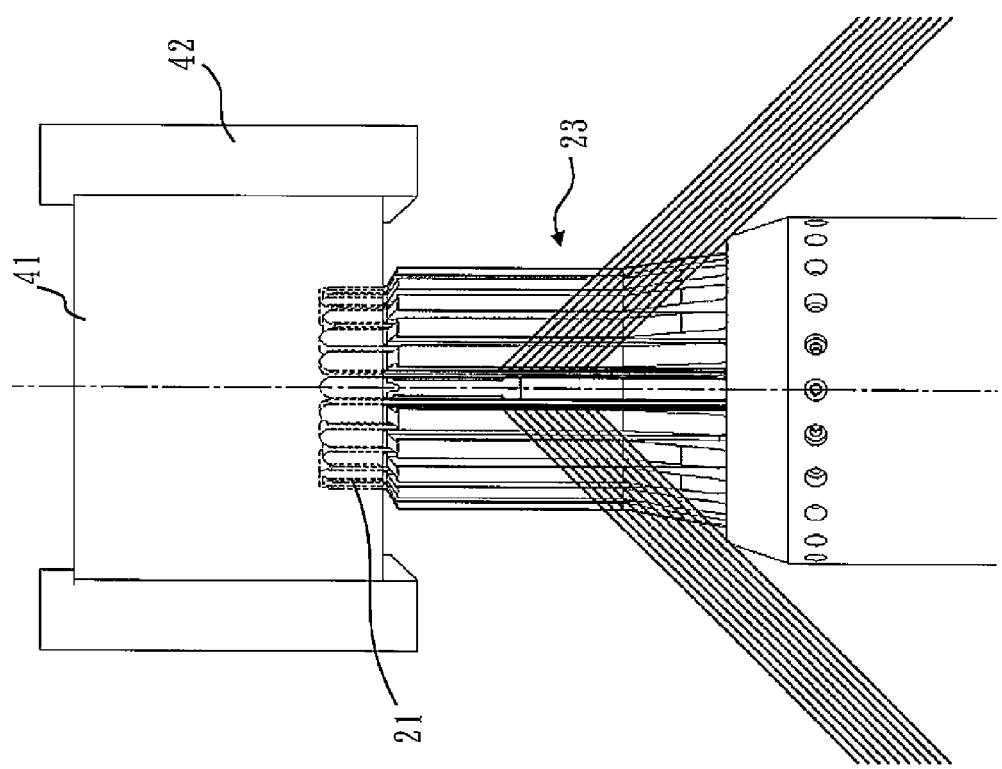
FIG. 8 shows a front view in which the coil insertion jig 23 of FIG. 2
Figure 9:
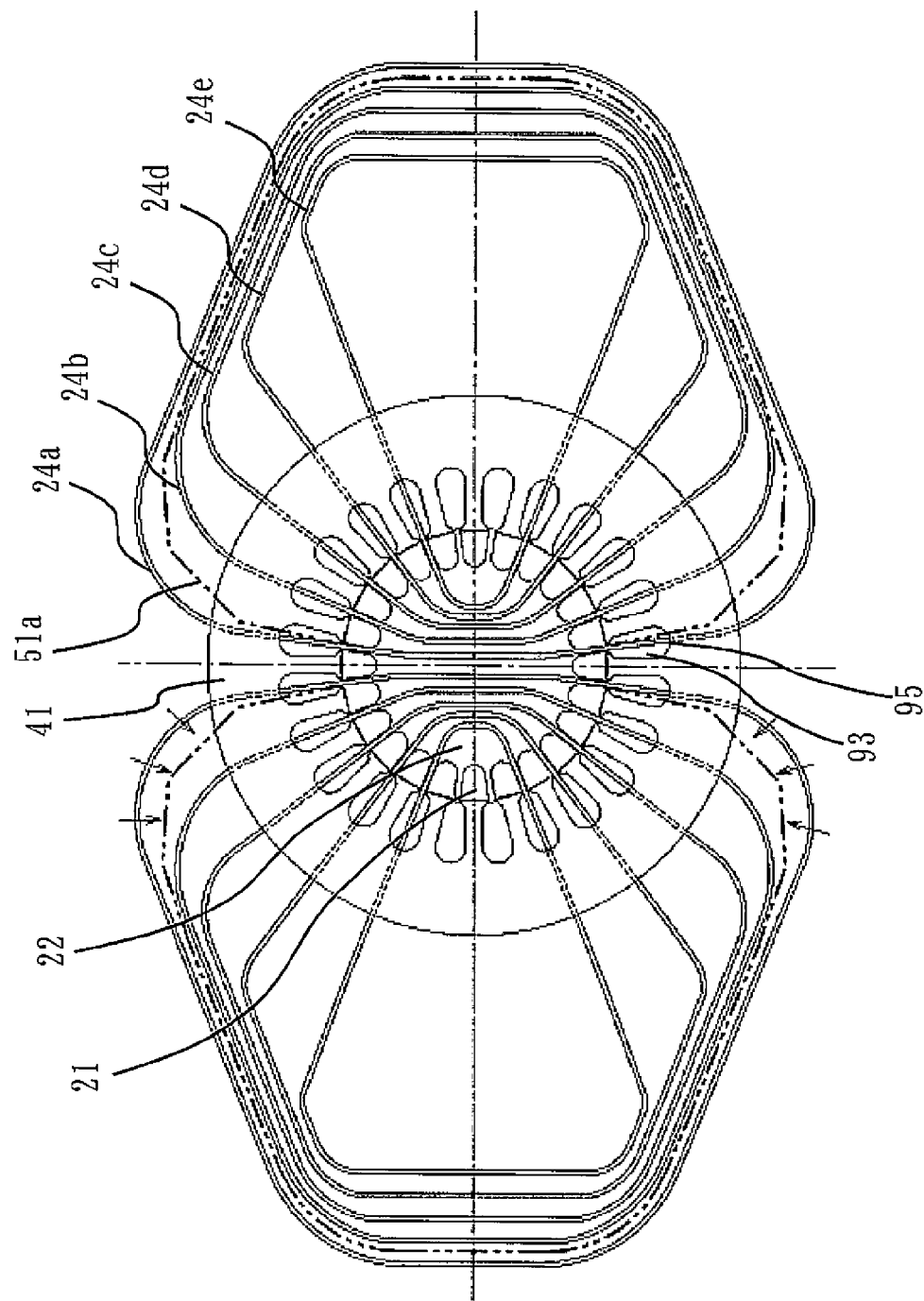
FIG. 9 shows the stator core 41, a stripper 22, the blades 21, and the coils 24 exclusively of FIG. 7, according to the first embodiment.
Figure 10:
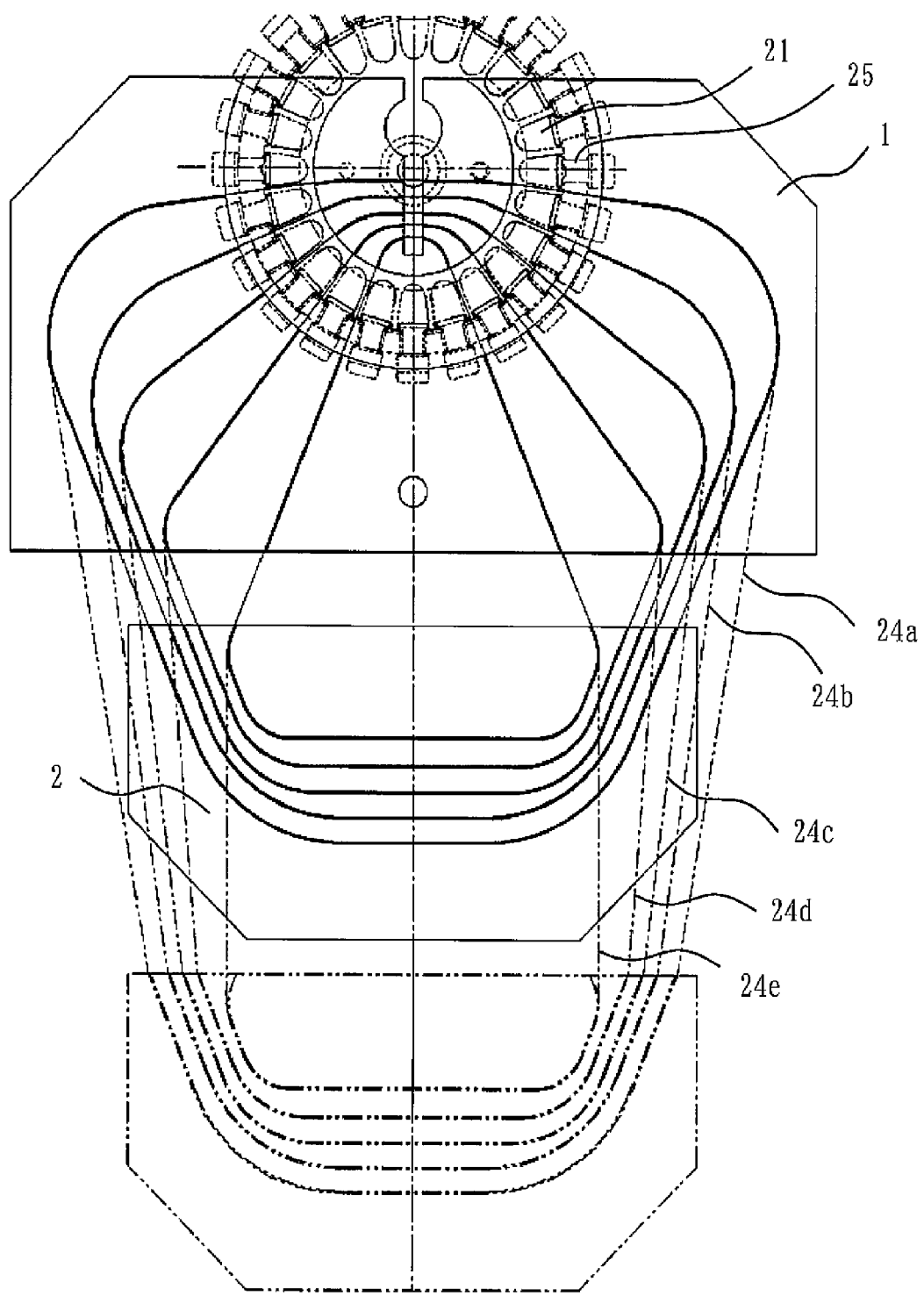
FIG. 10 shows an example of coil shapes obtained by adjusting the length of each turn of a coil by varying the distance between the pair of spool parts, the first spool part 1 and the second spool part 2.
Figure 11:
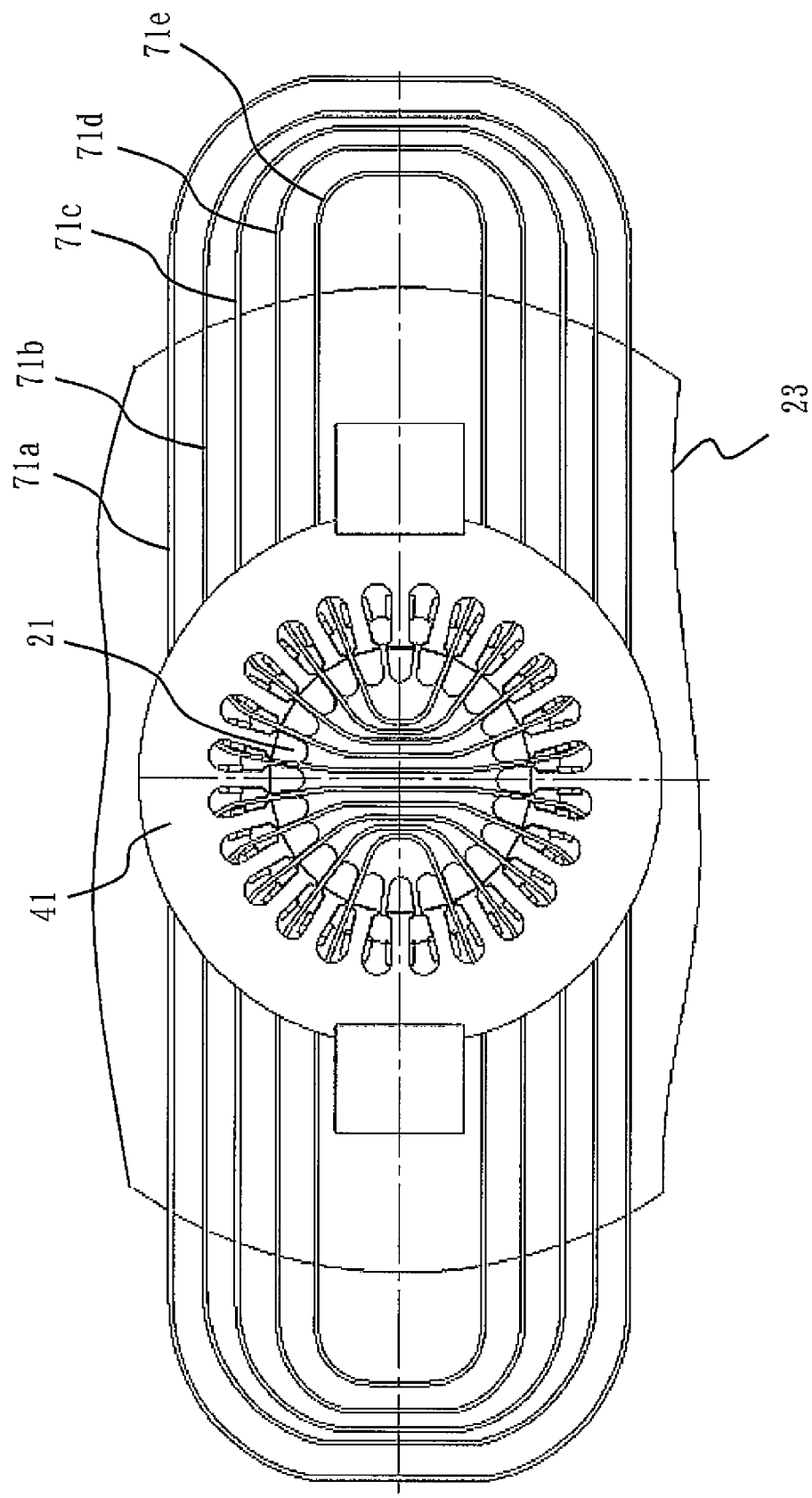
FIG. 11 shows a top view of a comparative example in which coils wound by a spool are set on the coil insertion jig 23, and the stator core 41 is set on a coil insertion device.
Figure 12:
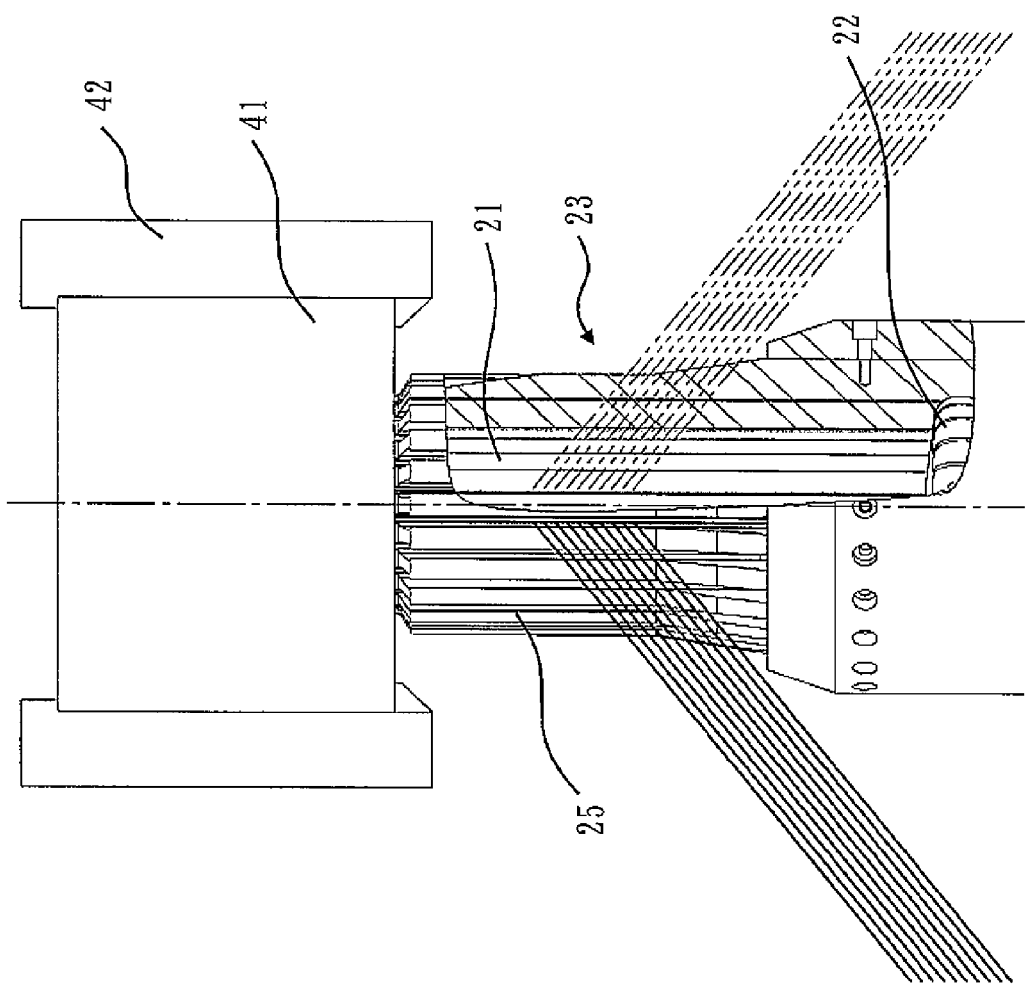
FIG. 12 shows a front view of a comparative example in which coils wound by the spool are set on the coil insertion jig 23, and the stator core 41 is set on the coil insertion device.
Figure 13:
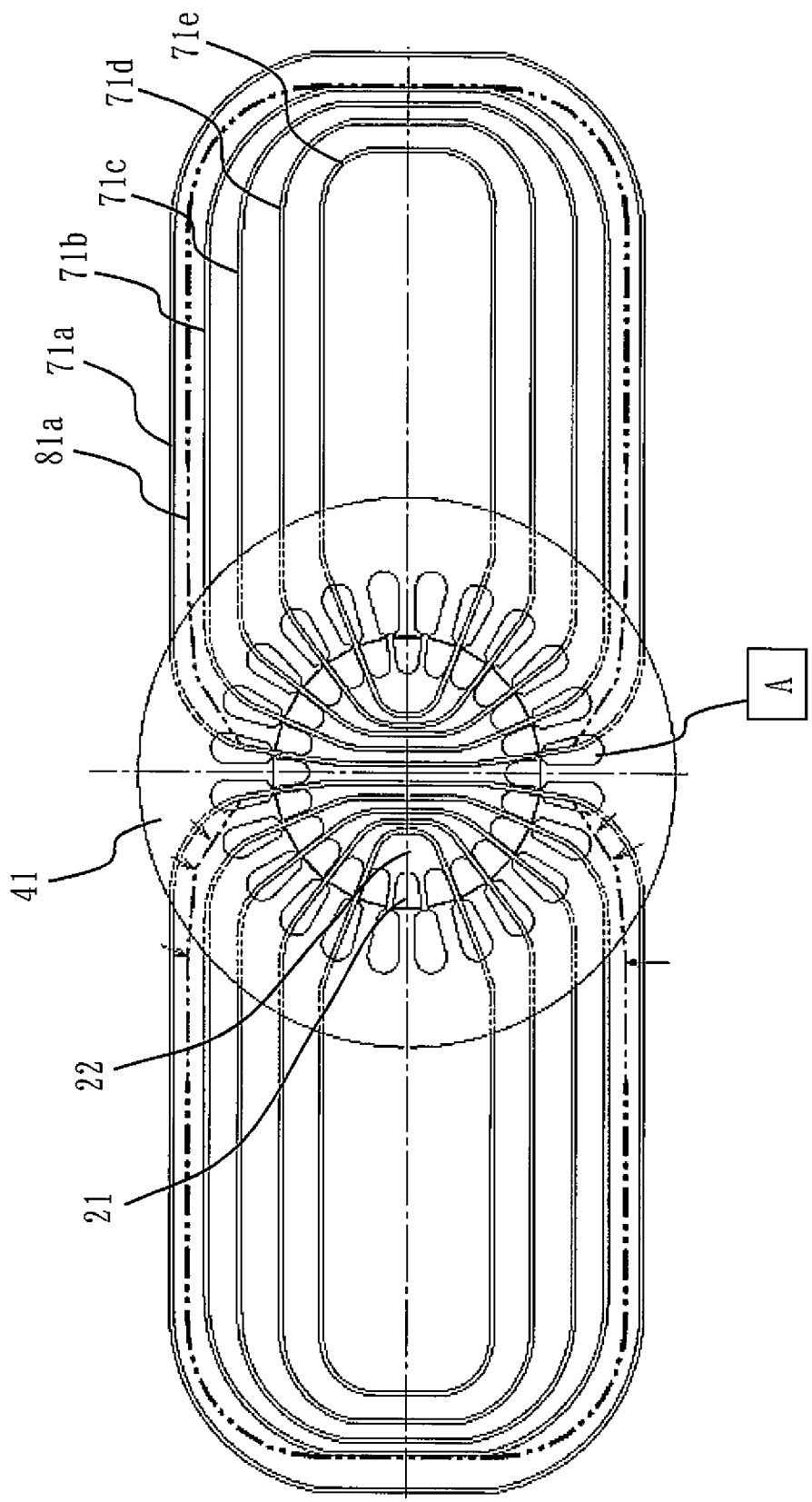
FIG. 13 shows a top view of a comparative example illustrating a location relationship among the stator core 41, the coils, and the blades 21 of FIG. 11 and FIG. 12.

EXPLANATION OF REFERENCE NUMERALS 1 front spool part
2 rear spool part
3 escape groove for a tip of a coil insertion jig
4 coil pusher slide groove
5a coil winding surface
5b coil winding surface
5c coil winding surface
5d coil winding surface
5e coil winding surface
6a coil winding surface
6b coil winding surface
6c coil winding surface
6d coil winding surface
6e coil winding surface
21 blade
22 stripper
23 coil insertion jig
24 coil
24a coil
24b coil
24c coil
24d coil
24e coil
25 wedge guide
31 spool bracket
32 coil pusher
33 flyer
41 stator core
42 core clamp
51a outermost coil transformed by a coil inserting process
71a coil
71b coil
71c coil
71d coil
71e coil
81a outermost coil transformed by a coil inserting process
91 wedge
92 inner slot insulating paper
93 slot
93a slot opening
94 coil wire leaking from a wedge
95 core back where the roots of teeth are connected
96 tooth/teeth

The invention claimed is:

1. A stator core in combination with a spool for a coil winding device for forming coils, wherein the coils are to be loaded in slots between teeth of the stator core by using a coil insertion device, the spool comprising:
a front spool part that is formed to have a plurality of coil winding surfaces formed to increase in diameter stepwise from the bottom upwards in a state where the spool is set on the coil winding device, and
a rear spool part that is formed to have a plurality of coil winding surfaces formed to increase in diameter stepwise from the bottom upwards in the state where the spool is set on the coil winding device,
wherein the front spool part and the rear spool part are placed at a distance from each other so that each turn of coil has a length corresponding to arbitrary lamination thickness of the stator core, and
wherein the plurality of coil winding surfaces of the front spool part includes a coil winding surface corresponding to an outermost coil, the coil winding surface being dimensioned so that when the outermost coil is wound on the coil winding surface, the outermost coil includes first and second straight-line portions angled relative to each other; and
if the first and second straight-line portions of the outermost coil are arranged parallel to respective first and second radial lines extending from a central axis of the stator core and if the first and second straight-line portions of the outermost coil overlap the respective first and second radial lines extending from the central axis of the stator core when viewing the first and second straight-line portions of the outermost coil along an axial direction of the stator core, the first straight-line portion of the outermost coil extends from a first position spaced apart from the central axis of the stator core to a second position radially outwardly of a core back where the roots of the teeth outside the slots of the stator core are connected when viewing the first straight-line portion of the outermost coil along the axial direction of the stator core.

2. A method of loading coils comprising:
fitting the coils with a wound shape in a coil insertion device by using the spool for a coil winding device according to claim 1, and
inserting and loading the coils fitted in the coil insertion device in the slots of the stator core of claim 1 by using the coil insertion device.

3. A stator core in combination with a spool for a coil winding device for forming coils, wherein the coils are to be loaded into at least one slot positioned between teeth of the stator core by using a coil insertion device, wherein the stator core possesses a central axis and the slot possesses an inner end and an outer end, the inner end of the slot being closer to the central axis of the stator core than the outer end of the slot, the spool comprising:
a front spool possessing a plurality of coil winding surfaces increasing in diameter stepwise from the bottom upwards when the spool is set on the coil winding device;
a rear spool possessing a plurality of coil winding surfaces increasing in diameter stepwise from the bottom upwards when the spool is set on the coil winding device;
wherein the front spool and the rear spool are spaced apart so that each turn of coil possesses a length corresponding to a lamination thickness of the stator core; and
wherein an outermost one of the plurality of coil winding surfaces of the front spool is dimensioned so that when an outermost coil is wound on the outermost coil winding surface, the outermost coil possesses a first linear length and a second linear length; and
if the outermost coil is arranged so that the first linear length of the outermost coil is parallel to a radial line extending from the central axis of the stator core and the second linear length of the outermost coil is the closest portion of the outermost coil to the central axis of the stator core, the first linear length of the outermost coil extends radially away from the central axis of the stator core from a first position spaced apart from the central axis of the stator core to a second position radially outwardly of the outer end of the slot when viewing the first linear length of the outermost coil along an axial direction of the stator core.

4. The stator core in combination with the spool of claim 3, wherein the first linear length of the outermost coil and the second linear length of the outermost coil are spaced apart.

5. The stator core in combination with the spool of claim 3, wherein the front spool comprises a groove positioned between the first linear length of the outermost coil and the second linear length of the outermost coil when the outermost coil is wound on the outermost coil winding surface.

6. The stator core in combination with the spool of claim 3, wherein the first linear length of the outermost coil is angled relative to the second linear length of the outermost coil.

7. The stator core in combination with the spool of claim 3, wherein the outermost coil winding surface of the front spool is dimensioned so that when the outermost coil is wound on the outermost coil winding surface, the outermost coil possesses a third length; and if the outermost coil is arranged so that the first linear length of the outermost coil is parallel to a radial line extending from the central axis of the stator core and the second linear length of the outermost coil is the closest portion of the outermost coil to the central axis of the stator core, the third length of the outermost coil extends radially away from the central axis of the stator core from a third position at least to a fourth position when viewing the third length of the outermost coil along an axial direction of the stator core, wherein the third position is spaced apart from the central axis of the stator core and the fourth position is located exterior to an outer end of an other slot, and wherein the third length of the outermost coil is spaced apart from the first linear length of the outermost coil.

8. The stator core in combination with the spool of claim 7, wherein the third length of the outermost coil is angled relative to the first linear length of the outermost coil and the second linear length of the outermost coil.

9. A stator core in combination with a spool for a coil winding device for forming coils, wherein each coil is to be loaded into at least one slot positioned between teeth of the stator core by using a coil insertion device, wherein the stator core possesses a central axis and each slot possesses an inner end and an outer end, the inner end of each slot being closer to the central axis of the stator core than the outer end of each slot, the spool comprising:

a front spool possessing a plurality of coil winding surfaces increasing in diameter stepwise from the bottom upwards when the spool is set on the coil winding device;

a rear spool possessing a plurality of coil winding surfaces increasing in diameter stepwise from the bottom upwards when the spool is set on the coil winding device;

wherein the front spool and the rear spool are spaced apart so that each turn of coil possesses a length corresponding to a lamination thickness of the stator core; and wherein an outermost one of the plurality of coil winding surfaces of the front spool is dimensioned so that when an outermost coil is wound on the outermost coil winding surface, the outermost coil possesses first and second straight-line portions angled relative to each other; and if the first and second straight-line portions of the outermost coil are arranged parallel to respective first and second radial lines extending from the central axis of the stator core and if the first and second straight-line portions of the outermost coil overlap the respective first and second radial lines extending from the central axis of the stator core when viewing the first and second straight-line portions of the outermost coil along an axial direction of the stator core, the first straight-line portion extends from an interior point of the stator core offset from the central axis of the stator core to a point radially outwardly of the outer end of a slot in which the outermost coil is to be loaded when viewing the first straight-line portion along the axial direction of the stator core.

10. The stator core in combination with the spool of claim 9, wherein the outermost coil winding surface of the front spool is dimensioned so that when the outermost coil is wound on the outermost coil winding surface, the second straight-line portion is longer than a second radial distance extending between a second interior point of the stator core offset from the central axis of the stator core and the outer end of a second slot in which the outermost coil is to be loaded.

* * * * *